M. I. SCHAMBERG.
ATTACHMENT FOR FAUCETS.
APPLICATION FILED JAN. 20, 1917. RENEWED OCT. 18, 1919.
1,342,000.
Patented June 1, 1920.
2 SHEETS—SHEET 1.
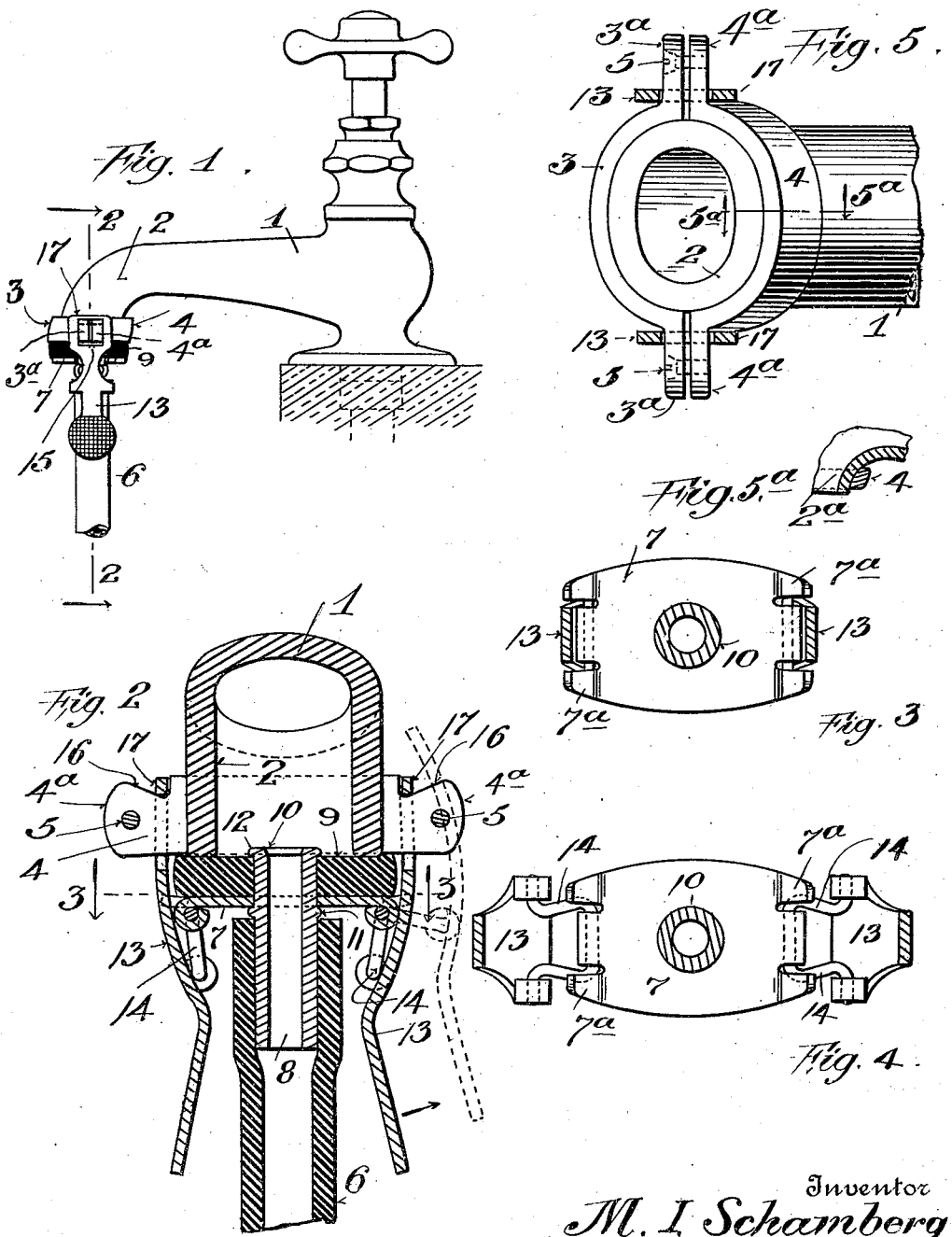
Inventor
M. I. Schamberg
By his Attorney M. I. SCHAMBERG.
ATTACHMENT FOR FAUCETS.
APPLICATION FILED JAN. 20, 1917. RENEWED OCT. 18, 1919.
1,342,000.
Patented June 1, 1920.
2 SHEETS—SHEET 2.
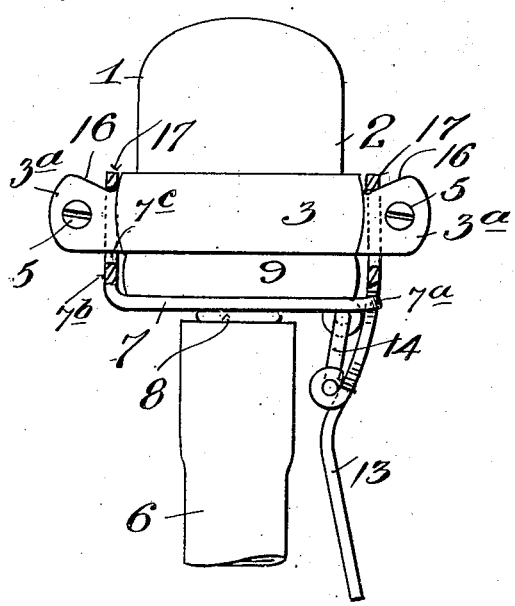
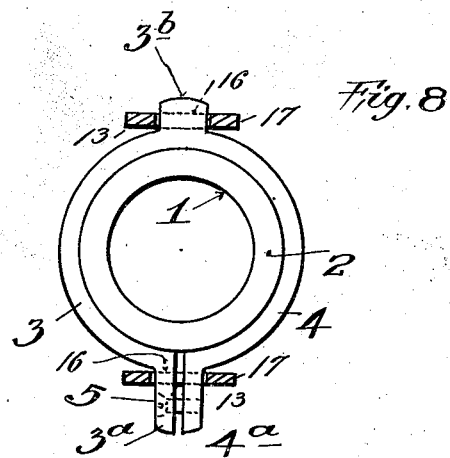
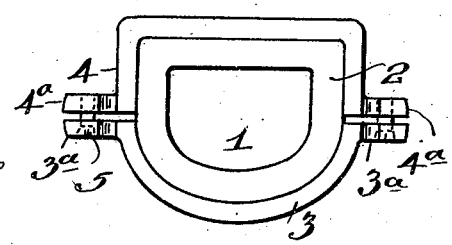
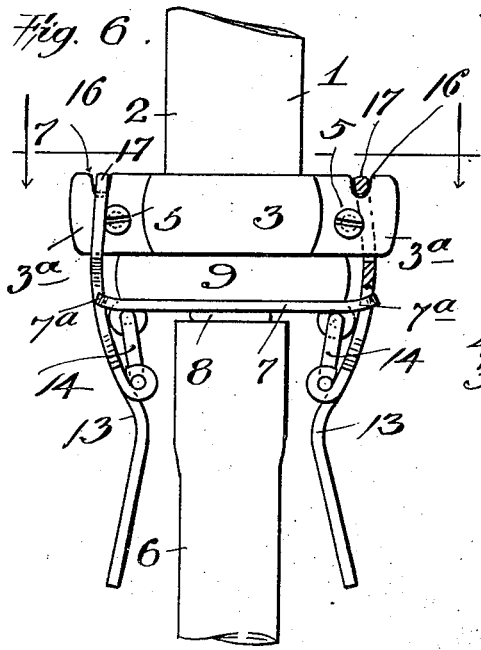
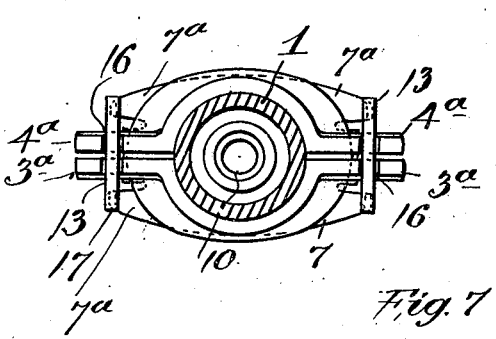
Inventor
M. I. Schamberg
By his Attorney
T. F. Bourne

UNITED STATES PATENT OFFICE.

MORRIS I. SCHAMBERG, OF NEW YORK, N. Y.

ATTACHMENT FOR FAUCETS.

1,342,000.      Specification of Letters Patent.      Patented June 1, 1920.

Application filed January 20, 1917, Serial No. 143,444. Renewed October 18, 1919. Serial No. 331,741.

*To all whom it may concern:*

Be it known that I, MORRIS I. SCHAMBERG, a citizen of the United States, and resident of New York city, borough of Manhattan, in the county of New York and State of New York, have invented certain new and useful Improvements in Attachments for Faucets, of which the following is a specification.

My invention relates to improvements in means for detachably connecting hose pipes with faucets or bibs, whereby the hose may be retained at the delivery end of the faucet tightly and without danger of leakage.

One of the objects of my invention is to provide means adapted to be clamped upon the exterior of the delivery end of faucets for connection with means on a hose to be clamped against such end of the faucet. Many faucets are in use and they vary in shape and dimensions, some having oval delivery orifices, others having circular orifices, and still others having different shapes, and my improvements are adapted to be detachably clamped around faucets or bibs in use, as well as those to be manufactured for use, without requiring the faucets to be specially made, or to be provided with threads to aid in attaching hose couplings thereto.

A further object of my invention is to provide improved couplings adapted to be connected with hose and to be clamped at the delivery end of faucets to securely retain the hose attached to the faucet end and to prevent leakage at the junction, my said improvements being particularly adapted for use in connection with the aforesaid means to be clamped on the faucets, whereby my improvements may be used with various styles of faucets.

My invention comprises novel details of improvement and combinations of parts that will be more fully hereinafter set forth and then pointed out in the claims.

Reference is to be had to the accompanying drawings forming part hereof, wherein, Figure 1 is a side view illustrating my improvements applied upon a faucet;

Fig. 2 is an enlarged vertical section substantially on the line 2, 2, in Fig. 1; Fig. 3 is a section on the line 3, 3, in Fig. 2; Fig. 4 is a section substantially the same as Fig. 3, illustrating the levers 13 in a different position; Fig. 5 is a perspective view illustrating my improved clamp upon the end of an oval faucet; Fig. 5$^a$ is a sectional detail on the line 5$^a$, 5$^a$, in Fig. 5; Fig. 6 is a side view, partly in section, illustrating my improvements upon the delivery end of a round faucet, also showing a variation of the clamping means on the faucet; Fig. 7 is a section on the line 7, 7, in Fig. 6; Figs. 8 and 9 are end views illustrating my improved clamp upon different shaped faucets, and Fig. 10 is a side view, partly in section, illustrating a modification.

In the drawings the numeral 1 indicates a faucet or bib which may be of any well known construction. Upon the delivery end portion 2 of the faucet I apply a clamping member, shown comprising two opposing parts or semi-bands 3 and 4, shaped to fit the exterior of the portion 2 of the faucet according to its contour, said member being provided with end lugs or projections. Said member may comprise two separate parts having end projections 3$^a$, 4$^a$, opposing one another when said parts are fitted on the faucet, suitable means, such as screws or the like 5, being adapted to secure said lugs or projections together to clamp the parts 3, 4, upon the faucet, or as shown in Fig. 8 the parts 3, 4, may be in a single piece of material having the opposing projections 3$^a$, 4$^a$, at one side secured by screws 5, or the like, and a unitary projection 3$^b$ at the opposite side. The said projections 3$^a$, 4$^a$ are shown extending laterally from opposite sides of the faucet in position to coact with means for attaching a hose to the faucet. The inner surfaces of the clamping members 3, 4, are preferably formed to substantially fit the corresponding exterior surface of the faucet. Where the faucet is of oval construction at its delivery end 2, such as shown in Figs. 1, 2, 5, 5$^a$ and 10, particularly at the inclined or sloping inner portion 2$^a$ thereof, the clamping part 4 is correspondingly inclined or sloped in an upward or transverse direction, to fit more or less snugly against such inclined or sloping part of the faucet. Where the delivery end portion 2 of the faucet is round the clamping parts 3, 4, will be correspondingly arranged, as shown in Figs. 7 and 8. Where the faucet has a different shape, such as illustrated in Fig. 9, having the delivery end portion 2 curved at one part and flat or squared at another, the part 3 will be shaped to correspond to such curved portion and the part 4 will be shaped to correspond to such flat or squared portion, as illustrated in Fig. 9. The aforesaid clamping means may be made to fit faucets of different size so as to be readily applied thereto by merely placing the parts 3, 4, around the delivery end portion of the faucet and fastening their projections or lugs by the screws 5. Such construction affords a simple and cheap means for application to faucets for the purposes stated, without requiring the faucets to be provided with threads to receive means to attach hose thereto, the impracticability of providing threads on the delivery ends of faucets that are not circular, either within or without, being obvious.

My improved device for connecting the hose 6 to the faucet may be described as follows: A plate-like member 7 is provided with a tubular projection 8, adapted to receive the hose 6, in an ordinary manner, and at 9 is a gasket, washer, or packing, which may comprise rubber, adapted to fit upon the member 7 to be pressed against the end of the faucet or the clamp thereon. In the example illustrated the member 7 has a tubular projection 10 adapted to receive an opening in gasket 9 to center and retain the latter on member 7, the bores of projections 8 and 10 being in communication for the flow of water from the faucet to the hose. The projections 8, 10, may comprise a piece of tubing secured to or mounted on member 7, and such tube may have a flange or projection 11, on one side of member 7, and a flange or projection 12 above washer or gasket 9 to retain it upon member 7. The parts 7, 8 and 10 may be made in separate pieces, or, if preferred, may be made in a single piece. At 13 are levers or arms pivotally connected with member 7. I have shown links 14, pivotally connected with member 7 and levers 13, which links normally depend beneath member or plate 7. The upper ends of levers 13 are provided with apertures or openings 15, adapted to receive the lugs or projections 3$^a$, 4$^a$, of the clamping member on the faucet. The upper edges of the lugs or projections 3$^a$, 4$^a$, are shown recessed or notched at 16 to receive the upper cross members 17 above the openings 15 of the levers 13 for retaining said levers in set positions and to keep them from moving outwardly. The projections 3$^a$, 4$^a$, are shown substantially rectangular in shape, with straight sides and top, and the apertures or openings 15 of the levers are correspondingly shaped, whereby the metal at the sides of said openings may engage said projections to prevent the levers from tilting edgewise relatively to said projections, whereby to assist in resisting dislocation of the coupling from the faucet in case the hose be pulled laterally, as to the right or left in Fig. 1.

As shown in Figs. 2 and 10 the recesses or notches 16 are shown inclined inwardly and downwardly and screws 5 are outside of the inner parts of said notches, whereby the proper positions of levers 13 will be located on clamp 3, 4, whereas in Fig. 6 the notches 16 are outside of the screws 5, for the latter purpose. Such arrangement permits the substantially equal spacing of notches 16 on clamps adapted to fit different sized faucets to accommodate members 7 and levers 13 of a standard size of hose attachment as described.

When a hose is to be applied to the faucet the levers 13 will be swung outwardly, their connecting links 14 permitting such movement, whereby openings 15 in the levers may be slipped over the corresponding pairs of projections 3$^a$, 4$^a$ of the clamping member on the faucet, (the dotted lines in Fig. 2 illustrating such position of lever 13), and then the cross parts 17 of the levers may be seated in the notches 16 and the lower ends of the levers may be swung toward the hose, whereby the links 14 will swing under member 7, exerting pressure on the latter to cause it to press the gasket or washer 9 against the end of the faucet to clamp the hose thereto, as illustrated in Figs. 2 and 6. The parts will remain in such position by reason of the relation of links 14 to the fulcrum points 17 of levers 13. When it is desired to release the hose from the faucet it is merely necessary to swing one or both levers 13 outwardly and remove the levers from their clamping means 3, 4.

I have shown member 7 provided with projecting end portions 7$^a$ that overlie the links 14, to prevent the latter from rising too high with respect to member 7, since, when levers 13 are raised with respect to member 7 said links may engage the projections 7$^a$, thereby making it more convenient in application of the levers to the supporting clamp on the faucet.

Instead of using two levers 13 and their corresponding links 14 for connection with the projections of the clamping means on the faucet, one of such levers may be used as illustrated in Fig. 10, and plate 7 may be provided at the end opposite said lever with a stationary projection, indicated at 7$^b$, having an opening 7$^c$ adapted to receive the corresponding projections 3$^a$, 4$^a$ of the clamping member on the faucet. In such instance, to apply the device to the faucet the opening of the part 7$^b$ will be placed over one end portion of clamping member 3, 4, and the lever 13 will then be swung outwardly and attached to the opposite projections of said clamping member and swung down with its link beneath member 7, (Fig. 14), in manner similar to that before described with regard to lever 13, whereby the hose will be clamped at the end of the faucet. To remove the hose from the faucet in the form shown in Fig. 10 lever 13 will be swung upwardly to release it from clamping member 3, 4 and then the projection 7$^b$ will be released from the clamping member.

While I have illustrated and described my improvements as being applicable to faucets or bibs, it will be understood that my improvements may be used for connecting hose with pipes, or for connecting two sections of hose together by applying the clamping members 3, 4, to an ordinary sleeve in or on the end of one hose.

Having now described my invention what I claim is:—

1. A hose coupling comprising a member adapted for connection with a hose, a lever adapted for connection with a faucet, a link pivotally connected with one part of said member to swing below the same, said link being pivotally connected with the lever at such point as to press the member toward the faucet when the lever is connected with the latter and is swung toward the hose, and means to connect another part of the member with the faucet.

2. A hose coupling comprising a member adapted for connection with a hose, links pivotally connected with said member on opposite sides thereof and adapted to depend below said member, and levers pivotally connected with said links in position to cause the links to push the member toward the faucet, said levers having means for attachment to a faucet and adapted to swing the links under the member.

3. The combination of a faucet having projections near its delivery end, a lever having means to engage one of said projections, a member adapted to oppose the delivery end of the faucet, and a link pivotally connected with said member and lever and adapted to swing below the member when the lever is connected with said projection, said member having means for attachment to the other of said projections.

4. The combination of a faucet provided with projections at opposite sides thereof, said projections being provided with notches at their upper edges, a member adapted to oppose the delivery end of the faucet, levers having openings adapted to receive said projections respectively and seat in the corresponding notches thereof, and links pivotally supporting said levers on said member.

5. The combination of a faucet provided with projections at opposite sides thereof, said projections being provided with notches at their upper edges, a member adapted to oppose the delivery end of the faucet, and levers having openings adapted to receive said projections respectively, the upper cross parts of the levers being straight and the sides of the levers at said openings being adapted to engage the projections, and means pivotally connecting the levers with said member for forcing the latter toward the delivery end of the faucet when the levers are attached to the projections and are swung toward each other.

Signed at New York city, in the county of New York, and State of New York, this 18th day of January, A. D. 1917.

MORRIS I. SCHAMBERG.

Witnesses:
T. F. BOURNE,
MARIE F. WAINRIGHT.